United States Patent [19]

Armijo et al.

[11] 4,200,492
[45] Apr. 29, 1980

[54] NUCLEAR FUEL ELEMENT

[75] Inventors: Joseph S. Armijo, Saratoga, Calif.;
Louis F. Coffin, Jr., Schenectady, N.Y.

[73] Assignee: General Electric Company, San Jose, Calif.

[21] Appl. No.: 838,161

[22] Filed: Sep. 30, 1977

Related U.S. Application Data

[63] Continuation-in-part of Ser. No. 727,183, Sep. 27, 1976, abandoned.

[51] Int. Cl.$^2$ ............................................. G21C 3/20
[52] U.S. Cl. ................................... 176/82; 176/91 R
[58] Field of Search .................... 176/66, 74, 82, 91 R

[56] References Cited

U.S. PATENT DOCUMENTS

| | | | |
|---|---|---|---|
| 3,053,743 | 9/1962 | Cain, Jr. | 176/79 |
| 3,145,150 | 8/1964 | Gylfe | 176/91 R |
| 3,262,860 | 7/1966 | Zebroski | 176/91 R |
| 3,365,371 | 1/1968 | Lass et al. | 176/66 |
| 3,442,761 | 5/1969 | Feraday | 176/91 R |

FOREIGN PATENT DOCUMENTS

| | | | |
|---|---|---|---|
| 933500 | 8/1961 | United Kingdom | 176/91 R |
| 1095205 | 12/1967 | United Kingdom | 176/91 R |

OTHER PUBLICATIONS

"Zirconium" 2nd Ed., Butterworth's Scientific Publishing by G. L. Miller, pp. 474–475.
"Elements of Physical Metallurgy" 2nd Ed., Addison Wesley Publishing Co., A. Guy, pp. 194–195.
Cladding Materials for Nuclear Reactor Fuels, (1/72), Kangilaski et al.

Primary Examiner—David H. Brown
Assistant Examiner—S. A. Cangialosi
Attorney, Agent, or Firm—Ivor J. James, Jr.; Samuel E. Turner; Sam E. Laub

[57] ABSTRACT

A nuclear fuel element for use in the core of a nuclear reactor is disclosed and has an improved composite cladding comprised of a moderate purity metal barrier of zirconium metallurgically bonded on the inside surface of a zirconium alloy tube. The metal barrier forms a shield between the alloy tube and a core of nuclear fuel material enclosed in the composite cladding. There is a gap between the cladding and the core. The metal barrier forms about 1 to about 30 percent of the thickness of the composite cladding and has low neutron absorption characteristics. The metal barrier serves as a preferential reaction site for gaseous impurities and fission products and protects the alloy tube from contact and reaction with such impurities and fission products. Methods of manufacturing the composite cladding are also disclosed.

5 Claims, 2 Drawing Figures

NUCLEAR FUEL ELEMENT

CROSS REFERENCE TO RELATED APPLICATION

This is a continuation-in-part of application Ser. No. 727,183 filed Sept. 27, 1976 now abandoned.

BACKGROUND OF THE INVENTION

This invention relates broadly to an improvement in nuclear fuel elements for use in the core of nuclear fission reactors and more particularly, to an improved nuclear fuel element having a composite cladding comprised of a metal barrier of sponge zirconium bonded to the inside surface of a zirconium alloy tube.

Nuclear reactors are presently being designed, constructed and operated in which the nuclear fuel is contained in fuel elements which can have various geometric shapes, such as plates, tubes, or rods. The fuel material is usually enclosed in a corrosion-resistant, nonreactive, heat-conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core, in turn, is enclosed within a reactor vessel through which a coolant is passed.

The cladding serves several purposes and two primary purposes are: first, to prevent contact and chemical reactions between the nuclear fuel and the coolant or the moderator if a moderator is present, or both if both coolant and moderator are present; and second, to prevent the radioactive fission products, some of which are gases, from being released from the fuel into the coolant or the moderator or both if both coolant and moderator are present. Common cladding materials are stainless steel, aluminum and its alloys, zirconium and its alloys, niobium (columbium), certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions occurring with these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and nonreactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is due to localized mechanical stresses on the fuel cladding resulting from differential expansion and friction between the fuel and the cladding. Fission products are created in the nuclear fuel by the fission chain reaction during operation of a nuclear reactor, and these fission products are released from the nuclear fuel and are present at the cladding surface. These localized stresses and strains in the presence of specific fission products, such as iodine and cadmium, are capable of producing cladding failures by phenomena known as stress corrosion cracking or liquid metal embrittlement.

Within the confines of a sealed fuel element, hydrogen gas can be generated by the slow reaction between the cladding and residual water inside the cladding, and this hydrogen gas may build up to levels which, under certain conditions, can result in localized hydriding of the cladding, with concurrent localized deterioration in the mechanical properties of the cladding. The cladding may also be adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor, and this occurs in spite of the fact that these gases may not be present in the reactor coolant or moderator and further, may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases upon heating, such as during fuel element manufacture and further release fission products during nuclear fission chain reactions. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

Thus, in light of the foregoing, it has been found desirable to minimize attack of the cladding from water, water vapor and gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with various materials. The nuclear fuel is coated with a ceramic to prevent moisture from coming in contact with the nuclear fuel material as disclosed in U.S. Pat. No. 3,108,396. U.S. Pat. No. 3,085,059 discloses a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 describes jacketed fissionable slugs of uranium canned in a metal case in which the protective jackets are comprised of a zinc-aluminum bonding layer. U.S. Pat. No. 2,849,387 discloses a jacketed fissionable body comprising a plurality of open-ended, jacketed body sections of nuclear fuel which have been dipped into a molten bath of a bonding material, giving an effective thermally conductive bond between the uranium body sections and the container (or cladding). The coating is disclosed as any metal alloy having good thermal conduction properties, with examples including aluminum-silicon and zinc-aluminum alloys. Japanese Patent Publication No. SHO 47-46559, dated Nov. 24, 1972, discloses consolidating discrete nuclear fuel particles into a carbon-containing matrix fuel composite by coating the fuel particles with a high density, smooth carbon-containing coating around the pellets. Still another coating disclosure is set forth in Japanese Patent Publication No. SHO 47-14200 in which one of two groups of pellets is coated with a layer of silicon carbide and the other group is coated with a layer of pyrocarbon or metal carbide.

The coating of nuclear fuel material introduces reliability problems in that achieving uniform coatings free of faults is difficult. Further, the deterioration of the coating can introduce problems with the long-lived performance of the nuclear fuel material.

U.S. patent application Ser. No. 330,152, filed Feb. 6, 1973, discloses a method for preventing corrosion of nuclear fuel cladding consisting of the addition of a metal such as niobium to the fuel. The additive can be in the form of a powder, provided the subsequent fuel processing operation does not oxidize the metal, or the additive can be incorporated into the fuel element as wires, sheets or in other forms, or can be placed around or between fuel pellets.

Document GEAP-4555, dated February, 1974, describes a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of ten to fifteen times the penalty for a zirconium alloy layer of the same thickness.

U.S. Pat. No. 3,502,549 discloses a method of protecting zirconium and its alloys by the electrolytic deposition of chrome to provide a composite material useful for nuclear reactors. A method for electrolytic deposition of copper on Zircaloy-2 surfaces and subsequent heat treatment for the purpose of obtaining diffusion of the electrolytically deposited metal is presented in *Energia Nucleare*, Volume 11, Number 9 (September 1964) at pages 505–508. In *Stability and Compatibility of Hydrogen Barriers Applied to Zirconium Alloys* by F. Brossa et al (European Atomic Energy Community, Joint Nuclear Research Center, EUR 4098e, 1969), methods of deposition of different coatings and their efficiency as hydrogen diffusion barriers are described along with an Al-Si coating as the most promising barrier against hydrogen diffusion. Methods for electroplating nickel on zirconium and zirconium-tin alloys and heat treating these articles to produce alloy-diffusion bonds are disclosed in *Electroplating on Zirconium and Zirconium-Tin* by W. C. Schickner et al (BMI-757, Technical Information Service, 1952). U.S. Pat. No. 3,625,821 describes a fuel element for a nuclear reactor having a fuel cladding tube with the inner surface of the tube being coated with a metal of low neutron capture cross section, such as nickel, and having finely dispersed particles of a burnable poison disposed therein. *Reactor Development Program Progress Report* of August, 1973 (ANLRDP-19) discloses a chemical getter arrangement of a sacrificial layer of chromium on the inner surface of a stainless steel cladding.

There are other patents disclosing coatings on the inside surface of the cladding of a fuel element. U.S. Pat. No. 3,145,150 claims a fuel element comprising a hollow, sealed pressure container comprised of a metal hydride loosely holding a core of fissionable material and a thin, corrosion-resistant jacket enclosing the pressure container. U.S. Pat. No. 3,053,743 discloses a fuel element having a metal clad tube coated on its inside wall with metallic nickel or a nickel-iron-chrome alloy and the tube surrounds a core of nuclear fuel pellets having occasional spacers between the pellets. British Pat. No. 933,500 describes a nuclear fuel element of deformed cross section in which individual particles of fuel are coated on their surface with one or more materials, enclosed in a clad member and subjected to a deformation process to reduce the cross section of the element.

Another approach has been to introduce a free-standing barrier between the nuclear fuel material and the cladding holding the nuclear fuel material, as disclosed in U.S. Pat. No. 3,230,150 (copper foil), German Patent Publication DAS 1,238,115 (titanium barrier), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding (e.g., some metals can react with the cladding, altering the properties of the cladding), or the nuclear fission reaction (e.g., by acting as neutron absorbers).

Further approaches to the barrier concept are disclosed in U.S. Pat. No. 3,969,186 (refractory metal, such as molybdenum, tungsten, rhenium, niobium and alloys thereof in the form of a tube or foil of single or multiple layers between the cladding and the fuel), and U.S. Pat. No. 3,925,151 (foil of zirconium, niobium or alloys thereof between the fuel and the cladding with a coating of a high lubricity material on either the liner or the cladding).

SUMMARY OF THE INVENTION

A particularly effective nuclear fuel element for use in the core of a nuclear reactor has a composite cladding comprised of a metal barrier of moderate purity zirconium (such as sponge zirconium) metallurgically bonded on the inside surface of a zirconium alloy tube. The composite cladding encloses the nuclear fuel material, leaving a gap between the fuel and the cladding. The metal barrier shields the alloy tube from the nuclear fuel material held in cladding as well as shielding the alloy tube from fission products and gases. The metal barrier forms about 1 to about 30 percent of the thickness of the cladding. A metal barrier forming less than about 1 percent of the thickness of the cladding would be difficult to achieve in commercial production, and a metal barrier forming more than 30 percent of the thickness of the cladding provides no additional benefit for the added thickness. Because of its purity the liner remains soft during irradiation and minimizes localized strain inside the nuclear fuel element, thus serving to protect the alloy tube from stress corrosion cracking or liquid metal embrittlement. The alloy tube portion of the cladding is completely unchanged in design and function from previous practice for a nuclear reactor and is selected from conventional cladding materials such as zirconium alloys.

Methods of manufacturing the composite cladding are also presented, including: (1) fitting a hollow collar of the metal barrier inside a hollow zirconium alloy billet, explosively bonding the collar to the billet and extruding the composite followed by tube reduction, (2) fitting a hollow collar of the metal barrier inside a hollow zirconium alloy billet, heating the collar and billet under compressive loads to produce diffusion bonding of the tube to the billet and extruding the composite followed by tube reduction, and (3) fitting a collar of the metal barrier inside a hollow zirconium alloy billet and extruding the composite followed by tube reduction.

The metal barrier does not introduce any significant neutron capture penalties, heat transfer penalties, or material incompatibility problems for the fuel element of this invention.

OBJECTS OF THE INVENTION

It is an object of this invention to provide a nuclear fuel element capable of operating in nuclear reactors for extended periods of time without the occurrence of splitting of the cladding, corrosion of the cladding, or other fuel failure problems.

It is another object of this invention to provide a nuclear fuel element with a composite cladding comprised of a metal barrier bonded on the inside surface of a zirconium alloy tube so that the bond provides a long-lived connection between the tube and the metal barrier.

Still another object of this invention is to provide a nuclear fuel element with a composite cladding comprised of a metal barrier bonded on the inside surface of a zirconium alloy tube with the metal barrier being comprised of sponge zirconium.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
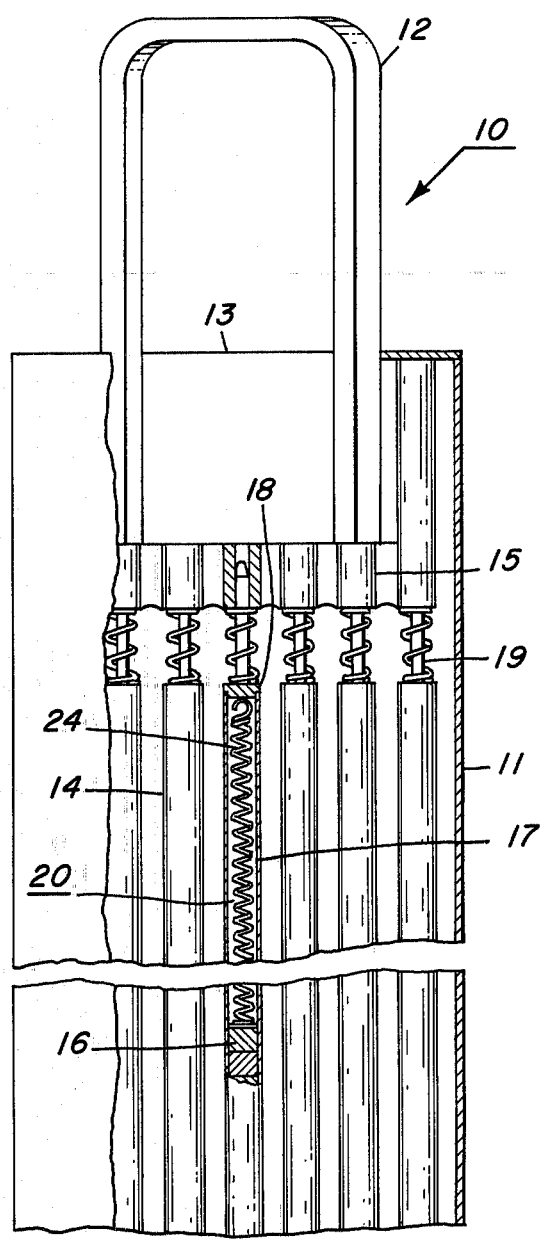
FIG. 1 is a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption, and resistance to bowing and vibration which is occasionally caused by flow of the coolant at high velocity.

A nuclear fuel element or rod 14 is shown in a partial section in FIG. 1 constructed according to the teachings of this invention. The fuel element includes a core or central cylindrical portion of nuclear fuel material 16, here shown as a plurality of fuel pellets of fissionable and/or fertile material positioned within a structural cladding or container 17. In some cases, the fuel pellets may be of various shapes, such as cylindrical pellets or spheres, and in other cases, different fuel forms such as particulate fuel may be used. The physical form of the fuel is immaterial to this invention. Various nuclear fuel materials may be used, including uranium compounds, plutonium compounds, thorium compounds and mixtures thereof. A preferred fuel is uranium dioxide or a mixture comprising uranium dioxide and plutonium dioxide.

Figure 2:
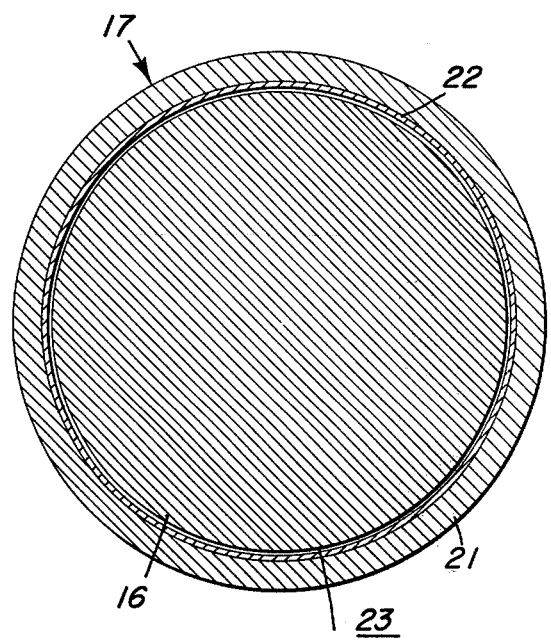
FIG. 2 is an enlarged cross-sectional view of the nuclear fuel element in FIG. 1 illustrating the teaching of this invention.

Referring now to FIG. 2, the nuclear fuel material 16 forming the central core of the fuel element 14 is surrounded by a cladding 17 hereinafter in this description also referred to as a composite cladding. The composite cladding container encloses the core so as to leave a gap 23 between the core and the cladding container during use in a nuclear reactor. The composite cladding is comprised of a zirconium alloy tube 21 which in a preferred embodiment of this invention is made of Zircaloy-2. The alloy tube has bonded on the inside surface thereof a metal barrier 22 so that the metal barrier forms a shield between the alloy tube 21 and the nuclear fuel material held in the cladding. The metal barrier forms about 1 to about 30 percent of the thickness of the cladding and is comprised of a low neutron absorption material, namely, moderate purity zirconium (such as sponge zirconium). The metal barrier 22 protects the alloy tube portion of the cladding from contact and reaction with gases and fission products and prevents the occurrence of localized stress and strain.

The content of the metal barrier of moderate purity zirconium is important and serves to impart special properties to the metal barrier. Generally, there is at least about 1000 parts per million (ppm) by weight and less than about 5000 ppm impurities in the material of the metal barrier and preferably less than about 4200 ppm. Of these oxygen is kept within the range of about 200 to about 1200 ppm. All other impurities are within the normal range for commercial, reactor grade sponge zirconium and are listed as follows: aluminum—75 ppm or less; boron—0.4 ppm or less; cadmium—0.4 ppm or less; carbon—270 ppm or less; chromium—200 ppm or less; cobalt—20 ppm or less; copper—50 ppm or less;

hafnium—100 ppm or less; hydrogen—25 ppm or less; iron—1500 ppm or less; magnesium—20 ppm or less; manganese—50 ppm or less; molybdenum—50 ppm or less; nickel—70 ppm or less; niobium—100 ppm or less; nitrogen—80 ppm or less; silicon—120 ppm or less; tin—50 ppm or less; tungsten—100 ppm or less; titanium—50 ppm or less; and uranium—3.5 ppm or less.

The composite cladding of the nuclear fuel element of this invention has the metal barrier bonded to the substrate in a strong bond. Metallographic examination shows that there is sufficient cross diffusion between the materials of the substrate and the metal barrier to form a bond, but no cross diffusion to any extent away from the area of the bond.

It has been discovered that sponge zirconium metal forming the metal barrier in the composite cladding is highly resistant to radiation hardening, and this enables the metal barrier after prolonged irradiation to maintain desirable structural properties such as yield strength and hardness at levels considerably lower than those of conventional zirconium alloys. In effect, the metal barrier does not harden as much as conventional zirconium alloys when subjected to irradiation, and this together with its initially low yield strength enables the metal barrier to deform plastically and relieve pellet-induced stresses in the fuel element during power transients. Pellet induced stresses in the fuel element can be brought about, for example, by swelling of the pellets of nuclear fuel at reactor operating temperatures (300° to 350° C.) so that the pellet comes into contact with the cladding.

It has further been discovered that a metal barrier of sponge zirconium of the order preferably about 5 to 15 percent of the thickness of the cladding and a particularly preferred thickness of 10 percent of the cladding bonded to the alloy tube of a zirconium alloy provides stress reduction and a barrier effect sufficient to prevent failures in the composite cladding.

Among the zirconium alloys serving as suitable alloy tubes are Zircaloy-2 and Zircaloy-4. Zircaloy-2 has on a weight basis about 1.5 percent tin; 0.12 percent iron; 0.09 percent chromium and 0.005 percent nickel and is extensively employed in water-cooled reactors. Zircaloy-4 has less nickel than Zircaloy-2 but contains slightly more iron than Zircaloy-2.

The composite cladding used in the nuclear fuel elements of this invention can be fabricated by any of the following methods.

In one method, a hollow collar of the sponge zirconium selected to be the metal barrier is inserted into a hollow billet of the zirconium alloy selected to be the alloy tube and then the assembly is subjected to explosive bonding of the collar to the billet. The composite is extruded at an elevated temperature of about 1000° to about 1400° F. (about 538° to about 750° C.) using conventional tube shell extrusion techniques. The extruded composite is then subjected to a process involving conventional tube reduction until the desired size of cladding is achieved.

In another method, a hollow collar of the sponge zirconium selected to be the metal barrier is inserted into a hollow billet of the zirconium alloy selected to be the alloy tube and then the assembly is subjected to a heating step [such as 1400° F. (750° C.) for about 8 hours] to give diffusion bonding between the collar and the billet. The composite is then extruded using conventional tube shell extrusion techniques and the extruded composite is subjected to a process involving conventional tube reduction until the desired size of cladding is achieved.

In still another method, a hollow collar of the sponge zirconium selected to be the metal barrier is inserted into a hollow billet of the zirconium alloy selected to be the alloy tube and the assembly is extruded using conventional tube shell extrusion techniques. Then the extruded composite is subjected to a process involving conventional tube reduction until the desired size of cladding is achieved.

The foregoing processes of fabricating the composite cladding of this invention give economies over other processes used in fabricating cladding such as electroplating or vapor deposition.

The invention includes a method of producing a nuclear fuel element comprising making a composite cladding container comprised of a metal barrier of sponge zirconium bonded to the inside surface of a zirconium alloy tube, which container is open at one end, filling the composite cladding container with a core of nuclear fuel material leaving a gap between the core and the container and leaving a cavity at the open end, inserting a nuclear fuel material retaining means into the cavity, applying an enclosure to the open end of the container leaving the cavity in communication with the nuclear fuel, and then bonding the end of the clad container to said enclosure to form a tight seal therebetween.

The present invention offers several advantages promoting a long operating life for a nuclear fuel element, including the reduction of chemical interaction of the cladding, the minimization of localized stress on the zirconium alloy tube portion of the cladding, the minimization of stress corrosion and strain corrosion on the zirconium alloy tube portion of the cladding, and the reduction of the probability of a splitting failure occurring in the zirconium alloy tube. The invention further prevents expansion (or swelling) of the nuclear fuel into direct contact with the zirconium alloy tube, and this prevents the occurrence of localized stress on the zirconium alloy tube, initiation or acceleration of stress corrosion of the alloy tube and bonding of the nuclear fuel to the alloy tube.

An important property of the composite cladding of this invention is that the foregoing improvements are achieved with no substantial additional neutron penalty. Such a cladding is readily accepted in nuclear reactors since the cladding would have no eutectic formation during a loss-of-coolant accident or an accident involving the dropping of a nuclear control rod. Further, the composite cladding has a very small heat transfer penalty in that there is no thermal barrier to transfer of heat such as results in the situation where a separate foil or liner is inserted in a fuel element. Also, the composite cladding of this invention is inspectable by conventional nondestructive testing methods during various stages of fabrication and operation.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element which comprises an elongated composite cladding container having a zirconium alloy tube containing constituents other than zirconium in an amount greater than about 5000 parts per million and a barrier of sponge zirconium metallurgically bonded to the inside surface of the alloy tube, said sponge zirconium barrier being of thickness from about 1% to 30% of the thickness of the said alloy tube, a central core of a body of nuclear fuel material selected from the group consisting of compounds of uranium, plutonium, thorium and mixtures thereof disposed in and partially filling said container so as to leave a gap between said container and said core and an internal cavity at one end of the container an enclosure integrally secured and sealed at each end of said container and a nuclear fuel material retaining means positioned in the cavity.

2. The nuclear fuel element of claim 1 which has in addition a cavity inside the fuel element and a nuclear fuel material retaining means comprising a helical member positioned in the cavity.

3. A nuclear fuel element of claim 1 in which the nuclear fuel material is comprised of plutonium compounds.

4. A nuclear fuel element of claim 1 in which the nuclear fuel material is comprised of uranium dioxide.

5. A nuclear fuel element of claim 1 in which the nuclear fuel material is a mixture comprising uranium dioxide and plutonium dioxide.

* * * * *

UNITED STATES PATENT OFFICE
CERTIFICATE OF CORRECTION

PATENT NO. : 4,200,492
DATED : 29 April 1980
INVENTOR(S) : Joseph S. Armijo et al It is certified that error appears in the above-identified patent and that said Letters Patent are hereby corrected as shown below:

Column 1, after "Background Of The Invention" insert --The Government has rights in this invention pursuant to Subcontract No. 3-20-46 under Prime Contract EN-77-C-02-4473 awarded by the U.S. Department of Energy.--

Signed and Sealed this

Ninth Day of September 1980

[SEAL]

Attest:

Attesting Officer

SIDNEY A. DIAMOND

Commissioner of Patents and Trademarks